United States Patent
Nagel et al.

(10) Patent No.: US 9,779,564 B2
(45) Date of Patent: Oct. 3, 2017

(54) DEVICE AND METHOD FOR CONTROLLING AN ACCESS AUTHORISATION AND/OR DRIVING AUTHORISATION FOR A VEHICLE

(71) Applicant: Daimler AG, Stuttgart (DE)

(72) Inventors: Gerhard Nagel, Gaertringen (DE); Santiago Pena Brossa, Stuttgart (DE); Markus Ruther, Esslingen (DE); Marc Scheerle, Kusterdingen (DE); Holger Schoepges, Hattenhofen (DE); Sylvain Subileau, Eningen (DE); Andreas Mueller, Holzgerlingen (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 14/408,994

(22) PCT Filed: Jun. 15, 2013

(86) PCT No.: PCT/EP2013/001777
§ 371 (c)(1),
(2) Date: Dec. 18, 2014

(87) PCT Pub. No.: WO2013/189584
PCT Pub. Date: Dec. 27, 2013

(65) Prior Publication Data
US 2015/0137943 A1 May 21, 2015

(30) Foreign Application Priority Data
Jun. 21, 2012 (DE) .......................... 10 2012 012 389

(51) Int. Cl.
*H04W 12/06* (2009.01)
*H04L 29/06* (2006.01)
(Continued)

(52) U.S. Cl.
CPC ...... *G07C 9/00007* (2013.01); *B60R 25/2018* (2013.01); *G06F 17/30557* (2013.01);
(Continued)

(58) Field of Classification Search
CPC ........ H04W 4/008; H04W 12/04; H04B 5/00; H04B 5/0025; H04B 5/0031;
(Continued)

(56) References Cited

U.S. PATENT DOCUMENTS

| 5,774,550 A | 6/1998 | Brinkmeyer et al. |
| 8,639,625 B1 * | 1/2014 | Ginter ..................... G06F 21/10 705/50 |

(Continued)

FOREIGN PATENT DOCUMENTS

| CN | 101361076 A | 2/2009 |
| DE | 44 11 451 C1 | 5/1995 |

(Continued)

OTHER PUBLICATIONS

International Search Report dated Aug. 9, 2013 with English translation (five (5) pages).

(Continued)

*Primary Examiner* — Dionne H Pendleton
(74) *Attorney, Agent, or Firm* — Crowell & Moring LLP

(57) ABSTRACT

A system for controlling an access authorization and/or driving authorization for a vehicle includes at least one mobile communication device and a control unit in the vehicle that receives and checks authorization data sent from the mobile communication device. The mobile communication device has a data carrier for storing the authorization data. The data carrier has at least one protected storage region for the storage of the authorization data. A database server transfers encrypted authorization data to the data carrier for storage in the protected storage region.

11 Claims, 1 Drawing Sheet

Figure 1:
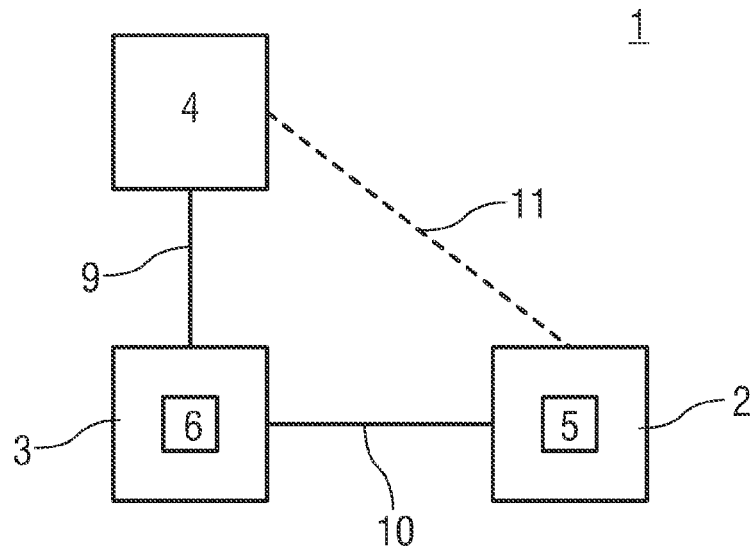

(51) Int. Cl.
*G07C 9/00* (2006.01)
*B60R 25/24* (2013.01)
*G06F 17/30* (2006.01)
*G07C 5/00* (2006.01)
*H04W 12/08* (2009.01)
*B60R 25/20* (2013.01)
*G06F 21/12* (2013.01)
*G07B 15/00* (2011.01)

(52) U.S. Cl.
CPC ......... *G07C 5/008* (2013.01); *G07C 9/00309* (2013.01); *G07C 9/00571* (2013.01); *H04W 12/08* (2013.01); *B60R 2325/205* (2013.01); *G06F 21/12* (2013.01); *G07B 15/00* (2013.01); *G07C 2009/00793* (2013.01)

(58) Field of Classification Search
CPC ...... H04B 5/0056; H04B 5/0062; H04B 5/02; B60K 2350/1076; B60K 35/00; B60P 3/06; B60P 3/07; B60R 2325/205; B60R 25/24; B60W 20/00; B60W 30/18; B60W 50/08; B60Y 2200/112; B62D 47/006; F02D 41/042; G01C 21/3423; G01C 21/3469; G07C 2009/00476; G07C 5/008; G07C 5/085; G07C 9/00309; G07C 9/00857; G07C 9/00896; G07C 5/00; G07C 5/0808; G07C 9/00126; G07C 9/00158; G07C 5/02; G07C 2009/00095; G07C 2009/00841; G07C 2009/00984; G07C 9/00087; G07C 9/00571; G07C 9/00817; H04L 2209/805; H04L 2209/84; H04L 9/14; H04L 9/3271; G06F 21/32; G06F 17/28; G06F 17/30247; G06F 17/30557; G06F 17/30864; G06F 21/00; G06F 21/31; G06F 3/016; G06F 3/017; G06F 3/0481; G06F 3/04842; G06F 3/0488; G06F 8/65; G06F 21/62; G06F 17/00; G06F 21/35; G08G 1/0965; G08G 1/096725; G08G 1/096741; G08G 1/096775; G08G 1/166; G08G 1/0116
See application file for complete search history.

(56) References Cited

U.S. PATENT DOCUMENTS

| | | | |
|---|---|---|---|
| 2002/0197955 A1* | 12/2002 | Witkowski | G07C 5/008 455/41.1 |
| 2004/0066092 A1 | 4/2004 | Muller | |
| 2006/0145809 A1* | 7/2006 | Crowhurst | B60R 25/246 340/5.62 |
| 2007/0043667 A1 | 2/2007 | Qawami et al. | |
| 2008/0102844 A1* | 5/2008 | Zhu | H04L 45/00 455/445 |
| 2011/0215758 A1* | 9/2011 | Stahlin | G07C 5/008 320/109 |
| 2012/0129493 A1* | 5/2012 | Vasudevan | B60R 25/24 455/411 |
| 2013/0029595 A1* | 1/2013 | Widmer | H04B 5/0031 455/39 |
| 2013/0204943 A1* | 8/2013 | Ricci | G06F 3/0484 709/204 |
| 2016/0049033 A1* | 2/2016 | Sigal | B60R 25/24 340/5.61 |
| 2016/0300417 A1* | 10/2016 | Hatton | G07C 9/00857 |
| 2017/0104754 A1* | 4/2017 | Brickel | H04L 9/3247 |

FOREIGN PATENT DOCUMENTS

| | | |
|---|---|---|
| DE | 100 64 546 C1 | 7/2002 |
| DE | 10 2005 023 570 A1 | 11/2006 |
| DE | 10 2005 038 471 A1 | 2/2007 |
| DE | 10 2011 011 697 A1 | 12/2011 |
| EP | 2 228 270 A1 | 9/2010 |
| WO | WO 2010/144490 A1 | 12/2010 |

OTHER PUBLICATIONS

German-language Written Opinion dated Aug. 9, 2013 (eight (8) pages).
Chinese-language Office Action issued in counterpart Chinese Application No. 201380032153.8 dated Jun. 29, 2016 with English translation (Nineteen (19) pages).
Chinese-language Office Action issued in counterpart Chinese Application No. 201380032153.8 dated Nov. 29, 2016 with partial English translation (Twelve (12) pages).

* cited by examiner

DEVICE AND METHOD FOR CONTROLLING AN ACCESS AUTHORISATION AND/OR DRIVING AUTHORISATION FOR A VEHICLE

BACKGROUND AND SUMMARY OF THE INVENTION

Exemplary embodiments of the invention relate to a system and method for controlling an access authorisation and/or driving authorisation for a vehicle.

German patent document DE 100 64 546 C 1 discloses a locking system for a motor vehicle in which an access authorisation and a driving authorisation are performed using a controller having communication means. These communication means detect a stationary transmitter and receiver unit on one side in the vehicle and a mobile transmitter and receiver unit in a wireless mobile telephone. In this communication, the controller checks the transmitted data for its access or driving authorisation and makes the corresponding system effective or ineffective in the case of success. The mobile telephone contains a SIM card for its telephonic network operation. In order to apply the locking system quickly and conveniently, the SIM card is both a carrier of the access and driving authorisation data. Furthermore, in the vehicle, a hands-free kit is used that consists of bidirectional near communication working in the GHz range. This telephonic near communication is, at the same time, used for the transmission of the access and/or driving authorisation data.

German patent document DE 10 2011 011 697 A1 disclose, a locking system and a method for controlling an access authorisation or driving authorisation for a vehicle. The locking system comprises a receiver device to receive authorisation data that is able to be securely integrated into the vehicle, a provision device for the provision of the authorisation data, and a control device for the control of an access authorisation and/or a driving authorisation for the vehicle, which is connected to the receiver device. The provision device is integrated into a mobile communication device or a data processing device. From this device, if necessary, authorisation profiles can be created and transferred to other mobile units.

German patent document DE 44 11 451 C 1 of the applicant (U.S. Pat. No. 5,774,550), the complete content of which is included herewith by reference, discloses a vehicle security device having electronic user authorisation coding. The vehicle security device contains an asymmetrical signature method, which only requires storage of secret information on the side of the keys in order to transfer authentication and/or synchronisation information from the keys to the vehicle side in a manner that is very secure against forgery.

Exemplary embodiments of the invention are directed to an improved system and an improved method to control an access authorisation and/or driving authorisation for a vehicle.

A system for controlling an access authorisation and/or driving authorisation for a vehicle comprises at least one mobile communication device and a control unit in the vehicle, which receives and checks authorisation data sent from the mobile communication device, wherein the mobile communication device has a data carrier for storing the authorisation data.

According to the invention, the data carrier of the mobile communication device can be implemented both physically as a hardware solution and virtually as a software solution. Therein the data carrier has at least one protected storage region for the storage of the authorisation data, wherein a database server, by means of which the authorisation data is able to be transferred in an encrypted manner to the data carrier, has a data storage authorisation for this protected storage region.

The system as well as a method that is able to be implemented by means of the system for controlling the access authorisation and/or driving authorisation for the vehicle enable a simplified allocation of the access authorisation and/or driving authorisation to different users as only a data carrier in a mobile communication device is required, which has a protected storage region in which the authorisation data which enables the access authorisation and/or driving authorisation, is to be transferred from the database server. This database server is expediently a database server of a manufacturer of the respective vehicle. This simple possibility of the allocation of the access authorisation and/or driving authorisation is very helpful, for example for rental vehicles or company vehicles or for so-called car sharing, and also enables, for example, an uncomplicated temporary user permission for the respective vehicle. Furthermore, an uncomplicated blocking of the access authorisation and/or driving authorisation is also enabled by means of the system, for example in the case of theft of the mobile communication device or of the vehicle. The transfer of the authorisation data from the database server to the data carrier of the mobile communication device can, for example, occur via a normal telecommunication link.

The system provides high security, as a closed security chain is provided for the data transfer from the database server to the data carrier of the mobile communication device and from this to the control unit of the vehicle. In particular, in the case of a data transfer by means of a so-called near field communication method (NFC), a use of an operating system of the mobile communication device for the data transfer from the data carrier of the mobile communication device to the control unit of the vehicle is not required. This also allows, for example, use of a mobile communication device having an empty battery, i.e. the operating system of the mobile communication device is inactive, or which is afflicted with viruses or Trojans, as the mobile communication device has no access to the protected storage region of the data carrier. Furthermore, the data transfer to the control unit of the vehicle can be implemented by means of the near field communication method also by means of a wireless energy transfer from the control unit of the vehicle to the mobile communication device, such that an energy supply by means of an energy source of mobile communication device, i.e. by means of a battery or an accumulator, is also not necessarily required.

The system is, in a simple manner, modularly expandable, by a plurality of data carriers and/or a plurality of vehicles, wherein authorisation data for a vehicle or for several vehicles is able to be stored on each data carrier.

BRIEF DESCRIPTION OF THE DRAWING FIGURES

Exemplary embodiments of the invention are illustrated in greater detail below by means of drawings.

Figure 2:
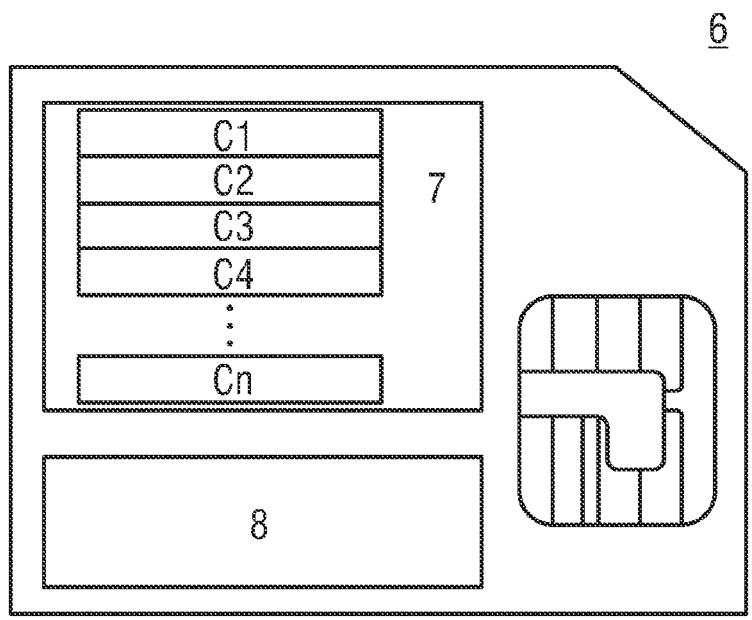

Here are shown:

FIG. 1 schematically, a system for controlling an access authorisation and/or driving authorisation for a vehicle, and FIG. 2 schematically, a data carrier.

Parts that correspond to one another are provided with the same reference numerals in all figures.

DETAILED DESCRIPTION

FIG. 1 shows schematically a system 1 for controlling an access authorisation and/or driving authorisation for a vehicle 2 that is only depicted schematically. A method for controlling the access authorisation and/or driving authorisation for the vehicle 2 is able to be implemented by means of this system 1. The system 1 and the method enable, in a simple manner, and with a high availability, an access authorisation and/or driving authorisation secured against unauthorised use for one or more vehicles 2 by means of a mobile communication device 3, for example by means of a mobile telephone. Therein the system 1 and the method ensure a closed security chain during a data transfer of authorisation data for the respective access authorisation and/or driving authorisation from a database server 4 to the mobile communication device 3 and, after a request of a control unit 5 of the vehicle 2, from the mobile communication device 3 to the control unit 5 of the vehicle 2.

The system 1 comprises, in the example depicted here, the mobile communication device 3 which, for example, is formed as a mobile telephone, advantageously as a so called smart phone, or, for example, as a portable computer, also referred to as a hand held device. Furthermore, the system 1 comprises the control unit 5 in the vehicle 2 that receives and checks the authorisation data sent by the mobile communication device 3. In the case of a positive result of this check, the access authorisation and/or driving authorisation for the vehicle 2 is issued by this control unit 5 of the vehicle 2. The control unit 5 can have one or more control devices and/or other units, for example microcontrollers.

The mobile communication device 3 has a data carrier 6 for storing the authorisation data, which is depicted in more detail in FIG. 2. This data carrier 6, which preferably is an exchangeable data carrier 6 of the mobile communication device 3, is formed, for example, as is depicted in FIG. 2, as a so-called Subscriber Identity Module (SIM) card of the mobile communication device 3.

The SIM card can be implemented both physically as a hardware solution and virtually as a software solution. As a hardware solution, different miniaturised SIM card chips exist such as mini SIM, micro SIM, nano SIM, which differ greatly in their size. Nano SIM is 30% smaller and 15% thinner again than the micro SIM. The smallest hardware SIM card is the MFF SIM, which corresponds to 8% of the original size.

Additionally, there are multifunctional SIM cards resulting from additional Hardware (NFC chip) or software developments. In the case of SIM cards with multi IMSI (IMSI: International Mobile Subscriber Identity), several IMSI of a mobile communication group for different countries can be applied per SIM card or several IMSI of different providers can be applied per country. Alternatively, network-neutral or "homeless" SIM cards can be used. An Embedded Universal Integrate Circuit Card eUICC also functions like a normal SIM card. A hardware SIM can be replaced by a software SIM ("SoftSIM", "Virtual SIM"), in that the data situated on the hardware chip is uploaded as software over-the-air (OTA) onto the mobile telephone.

The data carrier 6 can, however, in further exemplary embodiments, be formed as a memory card or as a so-called memory stick, also referred to as a USB stick.

The data carrier 6 has at least one protected storage region C1 to Cn for storing the authorisation data, i.e. a storage region that is secure to read and/or write.

The embodiment of the data carrier 6 depicted in FIG. 2 has a plurality of such protected storage regions C1 to Cn, also referred to as containers. These are formed in the so-called Secure Element of the data carrier 6, i.e. in a secured storage element 7 of the data carrier 6. In these protected storage regions C1 to Cn, a plurality of protected data is to be stored, as well as the authorisation data for a vehicle 2 or for a plurality of different vehicles 2, for example also data for financial services and other protected applications. For the storing of the protected data in one of these protected storage regions C1 to Cn, the respective protected storage region C1 to Cn is to be rented or acquired exclusively for example from a respective company, i.e. the respective company acquires an exclusive data storage authorisation for the respective protected storage region C1 to Cn.

The protected storage regions C1 to Cn are, for example, protected by means of a code, i.e. for example by means of an alphanumeric password, which is then known only to the company to whom the respective protected storage region C1 to Cn belongs or is allocated to. In this way, an unauthorised access to the respective protected storage region C1 to Cn is prevented. In addition to this secured storage element 7 having the one or more protected storage regions C1 to Cn, the data carrier 6 can, as is depicted in FIG. 2, have yet a further storage element 8 or also a plurality of such further storage elements 8, which then do not have to be secured and are to be saved on such other data which for example is to be created and/or used by the mobile communication device 3.

For the storage of the authorisation data for the access authorisation and/or driving authorisation for the vehicle 2, at least one of these protected storage regions C1 to Cn of the secured storage element 7 of the data carrier 6 is allocated exclusively to a manufacturer of the vehicle 2, i.e. the manufacturer of the vehicle 2 has rented at least one of these protected storage regions C1 to Cn on the data carrier 6 and the exclusive storage authorisation thereof. The code for the respective protected storage region C1 to Cn is then also only known by the manufacturer of the vehicle 2.

The system 1 furthermore comprises a database server 4, by means of which the authorisation data for the access authorisation and/or driving authorisation for the vehicle 2, encrypted on the data carrier 6, i.e. in the respective protected storage region C1 to Cn of the manufacturer, are able to be transferred. For this purpose, the database server 4 has the data storage authorisation required for this for the respective protected storage region C1 to Cn, i.e. the access to the database server 4 on the protected storage region C1 to Cn is secured by the code for the respective protected storage region C1 to Cn. This database server 4 is therefore expediently a database server of the manufacturer of the vehicle 2.

In order to be able to use the access authorisation and/or driving authorisation for a respective vehicle 2 via the mobile communication device 3, the method first involves, for example, a one-off registration of the mobile communication device 3 in the database server 4 of the manufacturer of the vehicle 2. The authorisation data, for example for all vehicles 2 of the manufacturer or only for selected vehicles 2 is made available on request on the database server 4 by the manufacturer. In the case of this registration, the authorisation data for the respective vehicle 2 is then transferred to the mobile communication device 3. For the transfer of further or amended authorisation data, for example, a registration on the database server 4 is then required again each time.

The authorisation data can, for example, be generated by means of a cryptographic method, for example as so-called hash values. Such a cryptographic method is, for example, described in German patent document DE 44 11 451 C 1 of the applicant, the complete content of which is herewith included by reference. The data transfer from the database server 4 to the mobile communication device 3 occurs expediently in an encrypted manner and end-to-end, i.e. directly from the database server 4 to the mobile communication device 3 via a public communication network 9, for example via a telecommunication network. The mobile communication device 3 receives the authorisation data and stores it in the respective protected storage region C1 to Cn of the data carrier 6 rented by the manufacturer of the vehicle 2.

After this registration process, the vehicle access and/or the vehicle use, i.e. the access authorisation and/or driving authorisation, occurs via the mobile communication device 3, i.e. via a communication between the mobile communication device 3 and the vehicle 2 or the control unit 5 thereof. For this purpose, a communication link 10 between the vehicle 2 and the mobile communication device 3 is constructed and the authorisation data is transferred from the data carrier 6 to the control unit 5 of the vehicle 2.

Therein the authorisation data is transferred from the mobile communication device 3 to the control unit 5 of the vehicle 2 expediently by means of a near field communication method, i.e. by means of a wireless communication method, in particular by means of NFC (Near Field Communication) or by means of Bluetooth. For this purpose the mobile communication device 3 is held on a near field communication interface of the vehicle 2 or positioned at a short distance to this. The near field communication interface is, for example, arranged in a door handle or a central console of the vehicle 2. An automatic connection set-up between the vehicle 2 and the mobile communication device 3 then occurs. The connection set-up originates from the vehicle 2, i.e. is initialised by this, for example by means of a so-called Challenge Response Method.

The connection to the secured storage element 7 of the data carrier 6 and the respective protected storage region C1 to Cn of the manufacturer situated therein is routed via the communication link 10 between the mobile communication device 3 and the vehicle 2, by means of the near field communication method, inclusive of a so-called Single Wire Protocol (SWP). Thus, a direct connection results between the control unit 5 of the vehicle 2 and the protected storage region C1 to Cn of the manufacturer on the data carrier 6 of the mobile communication device 3. The authorisation data is then transferred from the mobile communication device 3 to the vehicle 2 and checked in the control unit 5. In the case of a positive result, i.e. in the case of a positive authentication, the access authorisation and/or driving authorisation for the vehicle 2 is granted.

As well as the transfer of authorisation data for the access authorisation and/or driving authorisation for the vehicle 2, further data can also be transferred from the database server 4 to the respective protected storage region C1 to Cn of the data carrier 6 in the mobile communication device 3 and from this via the communication link 10, for example by means of NFC (Near Field Communication) or Bluetooth, to the control unit 5 of the vehicle, for example limiting information such as, for example, a duration of use and/or of a frequency of use of the vehicle 2. This is useful, for example, for a so-called fleet business, i.e. in the case of vehicles 2 which are used as rental cars, company cars or in so-called car sharing. Furthermore, data can also be transferred from the vehicle 2 to the mobile communication device 3 via the communication link 10, i.e. for example by means of Bluetooth or also by means of NFC (Near Field Communication), and for example can also be transferred from this to the database server 4 or to other devices, for example a current mileage and/or a current fuel level of the vehicle 2. Conversely, data can also be transferred from the mobile communication device 3 to the vehicle 2 via the communication link 10, for example stored personal vehicle settings such as seat and radio settings and/or maximum allowed driving speed.

The system 1 and the method enable a high security and at the same time a high availability of the authorisation data for the access authorisation and/or driving authorisation for vehicle 2, as a closed security chain is present during the data transfer from the database server 4 to the mobile communication device 3 and from this to the vehicle 2 or to the control unit 5 of the vehicle 2, which checks and authenticates the access authorisation and/or driving authorisation. In particular, a use of an operating system of the mobile communication device 3 is not required and an exertion of influence of the operating system or other programs of the mobile communication device 3 on this data transfer from the database server 4 to the data carrier 6 of the mobile communication device 3 and from this to the vehicle 2 is not possible, i.e. the exertion of influence of viruses or Trojans is not possible, for example, such that even those mobile communication devices 3 that are afflicted with viruses or Trojans can be used without problem.

Furthermore, for example, mobile communication devices 3 can also be used that have an empty battery, i.e. the operating system of the mobile communication device is inactive, as the mobile communication device 3 has no access to the protected storage region C1 to Cn of the data carrier 6. Additionally, the data transfer to the control unit 5 of the vehicle 2 can be implemented by means of the near field communication method, also by means of a wireless energy transfer from the control unit 5 of the vehicle 2 to the mobile communication device 3, such that an energy supply by means of an energy source of mobile communication device 3, i.e. by means of a battery or an accumulator, is also not necessarily required.

Additionally, the access authorisation and/or driving authorisation for the vehicle 2 is to be blocked in a simple manner. This is useful, for example, in the case of theft of the mobile communication device 3 or of the data carrier 6 or in the case of a theft of the vehicle 2 or in the case of a temporary use of the vehicle 2 if, for example, it is a rental car, a company car or a car sharing vehicle. The blocking can, for example, occur by a data transfer from the database server 4 to the mobile communication device 3 in order to delete or to change in this way the authorisation data in the respective protected storage region C1 to Cn of the manufacturer, or optionally, a direct data transfer from the database server 4 or, for example, another device of the manufacturer to the respective vehicle 2 occurs, more precisely to the control unit 5 of the respective vehicle 2 via a corresponding further communication link 11, such that then in the case of a checking of the previously granted and no longer valid authorisation data, a positive authentication does not occur and thus access authorisation and/or driving authorisation is not granted for the vehicle 2.

The system 1 and the method enable, in the manner described, a simplified issuing and withdrawal of access authorisations and/or driving authorisations for vehicles 2. This is advantageous both for private vehicles and in particular in fleet business, i.e. for rental cars, company cars and in car sharing. Furthermore, the system 1 is modularly expandable by further vehicles 2 and/or further data carriers 6 and/or further mobile communication devices 3 which retrieve the authorisation data for one or more vehicles 2 from the database server 4 of the respective manufacturer.

For a secure transfer of the authorisation data for the access/driving authorisation for the vehicle 2, the communication between the mobile communication device 3 and the database server 4 must be encrypted or secured. This securing or registration of the mobile communication device 3 in the database server 4 of the manufacturer of the vehicle 2 can occur in two steps, in particular the initialisation and the personalisation of the data carrier 6 or of the mobile communication device 3 occur.

In the initialisation of the data carrier 6 or of the mobile communication device 3, firstly data is entered on the data carrier 6 in the protected storage region C1 to Cn. This data can, for example, be a certificate, an initialisation file or executable software. The application of the data can be implemented by the vehicle manufacturer or service provider, wherein the content of the data is only known to the vehicle manufacturer. By means of this initialisation file/software, start values in the form of cryptographic keys can be generated and entered on the SIM card or in the protected storage region C1 to Cn. These start values are then used for the encryption of the communication between the mobile communication device 3 and the database server 4.

Therein, an asymmetric cryptographic method such as RSA (Rivest, Shamir and Adleman) or a suitable symmetrical method such as, for example, DES/AES (Data Encryption Standard/Advanced Encryption Standard) can be used for the encrypted transfer. A start value/cryptographic key, which is generated by the initialisation file/software, is entered on the SIM card or in the protected storage region C1 to Cn. This start value can be used as a private key for the RSA method and is encrypted with a public key of the database server and transferred to the database server 4. The public key of the database server can be a part of the initialisation file/software and can be entered on the SIM card or in the protected storage region C1 to Cn. The database server decodes the start value by means of the public key known to it and uses this start value for the identification of the SIM card or of the protected storage region or for the communication between the mobile communication device 3 and the database server 4. Such an encrypted communication between the mobile communication device 3 and the database server 4 is thus secure against the reading or manipulation of third parties. Also, the service provider is no longer able to read the communication.

In the case of the personalisation of the data carrier 6 or of the mobile communication device 3, the authorisation data for the release of the access/driving authorisation system of the vehicle is transferred to the data carrier 6 or to the protected storage region C1 to Cn in an encrypted manner. First, the presence of the vehicle 2 is checked by the database server. Then a communication between the database server 4, the mobile communication device 3 and the vehicle 2 is constructed.

This process is started by the request from the vehicle owner to the database server 4 e.g. via an access-protected website of the vehicle. Typically, herein a server, i.e. the database server 4 or a further server, already has the knowledge that an authorisation of a vehicle owner for the access to the access-protected website of the vehicle and therefore for the vehicle itself is present. The access or the authentication of the vehicle owner is, for example, secured by the user name and the password. Likewise, the request can also be started by the mobile communication device 3 from the vehicle owner.

After the successful checking of the authentication of the vehicle owner from the database server 4, the database server transmits the request to the vehicle via the mobile communication device. Only if the database server receives an answer from the vehicle via the mobile communication device is the authorisation data for the release of the access/driving authorisation system of the vehicle transferred to the data carrier 6 or to the protected storage region C1 to Cn in an encrypted manner. The communication between the database server and the vehicle runs via the mobile communication device, and can be encrypted just as during initialisation. For the encryption, the start value/cryptographic key, which was generated by the initialisation file/software during the initialisation, can be used. The authorisation data can be decrypted and entered into the suitable protected storage region which has the correct start value/cryptographic key.

During the personalisation, a determined number of pieces of authorisation data is transferred from the database server to the mobile communication device and is entered on the SIM card in the suitable protected storage region having the correct start value/cryptographic key. The authorisation data is generated centrally by the database server and is transferred with the required personalisation to the mobile communication device. The personalisation can only be implemented by the database server and continually. In the case that the number of pieces of authorisation data reaches a defined threshold, the mobile communication device can request a renewed personalisation to the database server. The database server can subsequently check whether the mobile communication device or also further mobile communication devices are authorised to enter the authorisation data on the SIM card in the suitable protected storage region.

Thus, a piece of information is always present on the database server concerning the number or users having authorisation data for the individual vehicle. This makes the vehicle use for rental cars, company cars, or car sharing particularly simple and secure. A temporary access/driving authorisation can be transferred easily onto a mobile terminal. Thus, a temporary use of vehicles by several persons is possible in a secure and simple manner, wherein a secure control of the issued "vehicle keys" is maintained. In the case of an unauthorised use, not only can the use of the vehicle be prohibited, but also the authorisation data can be made invalid or deleted on a determined mobile communication device. A determined SIM card or mobile communication device for the access/driving authorisation system can also be blocked. The vehicle manufacturer always has the summary of the number of authorised vehicle keys or mobile communication devices due to the database server.

If the initialisation and the personalisation for a mobile communication device or for a protected storage region on a SIM card was implemented successfully, then a determined number of pieces of authorisation data for the access/driving authorisation is then entered in the protected storage region on the SIM card. This authorisation data can be transferred to the vehicle 1 by means of a near field communication method, i.e. by means of a wireless communication method, for example NFC or Bluetooth, in order to thus be able to open or close the vehicle 1 and to release the vehicle 1 for driving.

Therein the access/driving authorisation system has a near field communication interface, for example an NFC or Bluetooth interface. In order to be able to construct a clear communication between the mobile communication device and the vehicle, a one-off pairing of the corresponding interfaces can be required. This pairing can occur in an encrypted manner by, for example, transfer of interface identification data (D).

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE NUMERALS

1 System
2 Vehicle
3 Communication device
4 Database server
5 Control unit
6 Data carrier
7 Secured storage element
8 Further storage element
9 Communication network
10 Communication link
11 Further communication link
C1 to Cn—protected storage region

The invention claimed is:

1. An access authorization or driving authorization system for a vehicle, comprising:
a database server,
authorization data from a vehicle manufacturer for release to the conditional access authorization or driver authorization system in the vehicle,
an access authorization or driving authorization system,
a communication link between a mobile communication device and the access authorization or driving authorization system, wherein the communication link is configured to transfer the authorization data from the mobile communication device to the access authorization or driving authorization system,
wherein the authorization data is stored on a data carrier in a protected storage region, the database server, which is used to transmit the authorization data in encrypted form to the data carrier, having a data storage authorization for the protected storage region,
wherein the communication link between the mobile communication device and the access authorization or driving authorization system is a wireless near field communication, and
wherein the database server is configured to transmit the authorization data, authorized by the vehicle manufacturer, to the mobile communication device.

2. The access authorization or driving authorization system of claim 1, wherein the authorization data is transmitted from the database server to the mobile communication device only after authentication of the mobile communication device on the database server.

3. The access authorization or driving authorization system of claim 1, wherein the protected storage region is a virtual storage region.

4. The access authorization or driving authorization system of claim 1, wherein the authorization data for the release to the access authorization or vehicle authorization system of several vehicles is stored in the protected storage region of the data carrier.

5. The access authorization or driving authorization system of claim 1, wherein data from the vehicle manufacturer is stored in the protected storage region, wherein the data from the vehicle manufacturer is a software, and wherein the authorization data is generated using the data from the vehicle manufacturer or is collected by the database server.

6. The access authorization or vehicle authorization system of claim 1, wherein the wireless near field communication between the mobile communication device and the access authorization or driving authorization system is a Near Field Communication (NFC) or a Bluetooth communication.

7. A method for allocating an access authorization or driving authorization for a vehicle, the method comprising:
storing authorization data for release to an access authorization or driving authorization system of the vehicle in a protected storage region of a data carrier of a mobile communication device, wherein a database server, which is used to transmit the authorization data in encrypted form to the data carrier, has a data storage authorization for the protected storage region;
establishing a communication link between the mobile communication device and the access authorization or driving authorization system of the vehicle using a near field communication system; and
performing the access authorization or driving authorization over the established communication link.

8. The method of claim 7, wherein additional data is communicated from a database server to the protected storage region in the mobile communication device and from the mobile communication device to a vehicle control unit via the communication link, the additional data including one or more of: (i) limiting information regarding a duration of use or frequency of use, (ii) stored personal vehicle settings such as seat settings or radio settings, (iii) or a maximum permissible driving speed.

9. The method of claim 7, wherein a blocking occurs via transmission of data from a database server to the mobile communication device.

10. The method of claim 7, wherein
a one-off registration of the mobile communication device with the database server of a vehicle manufacturer is required.

11. The method of claim 10, wherein the one-off registration of the mobile communication device is started through a query by a vehicle owner to the database server via an access-protected website for the vehicle.

* * * * *